E. A. SPERRY.
GYROSCOPIC COMPASS.
APPLICATION FILED JUNE 21, 1911.
1,279,471.
Patented Sept. 17, 1918.
3 SHEETS—SHEET 2.
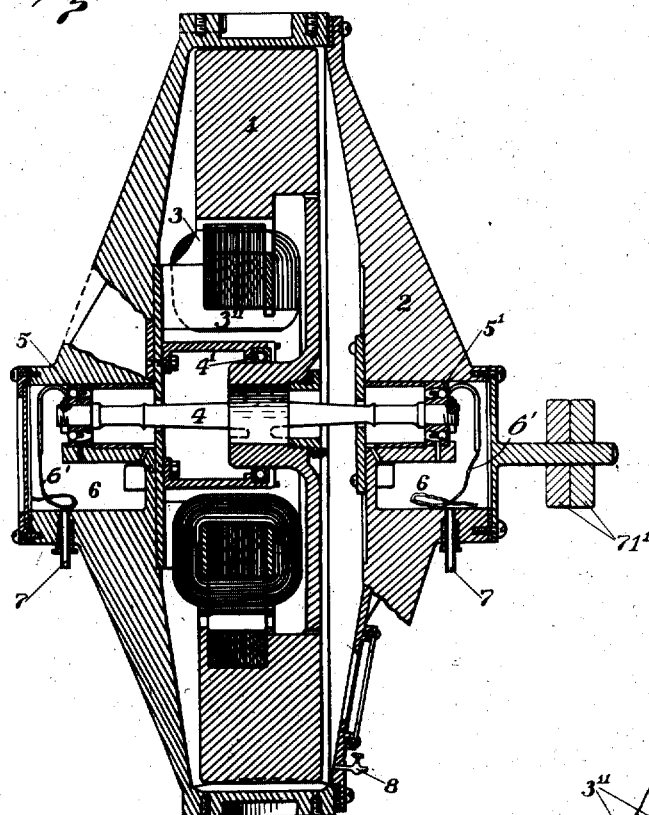
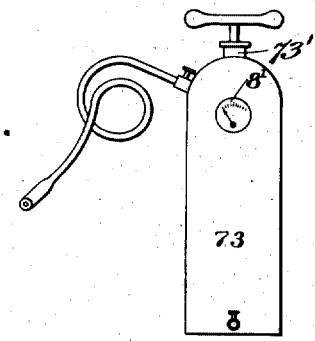
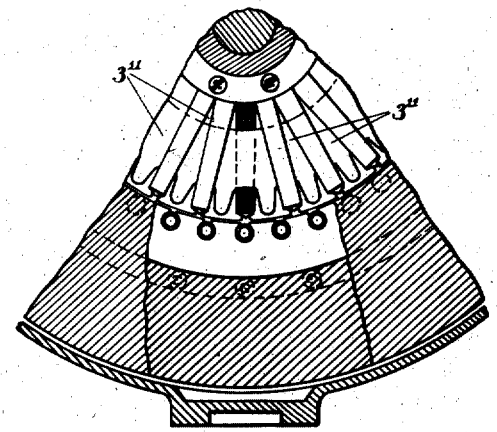
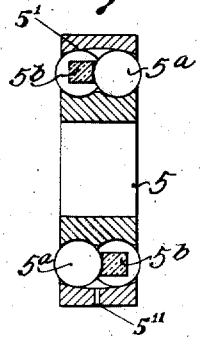

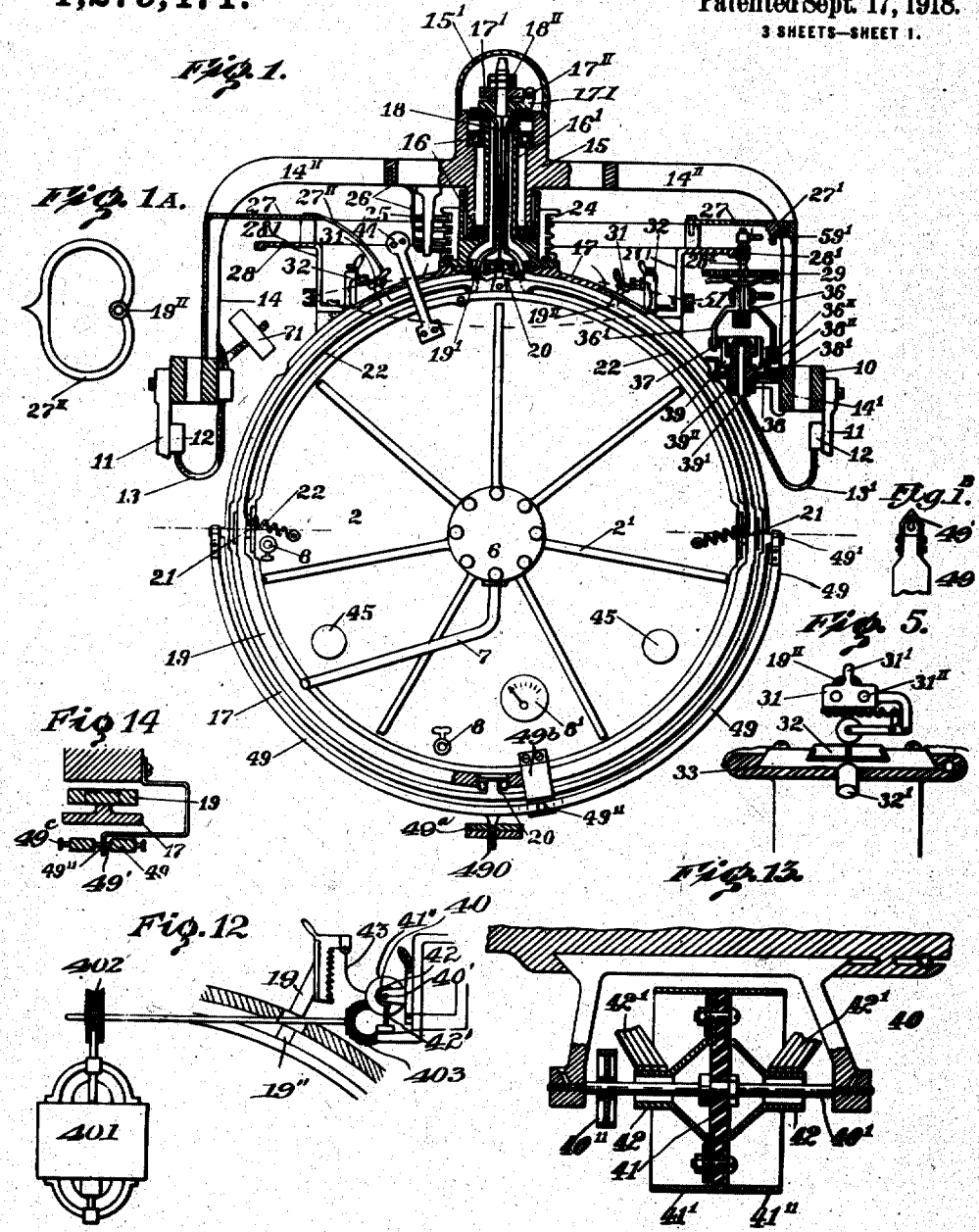

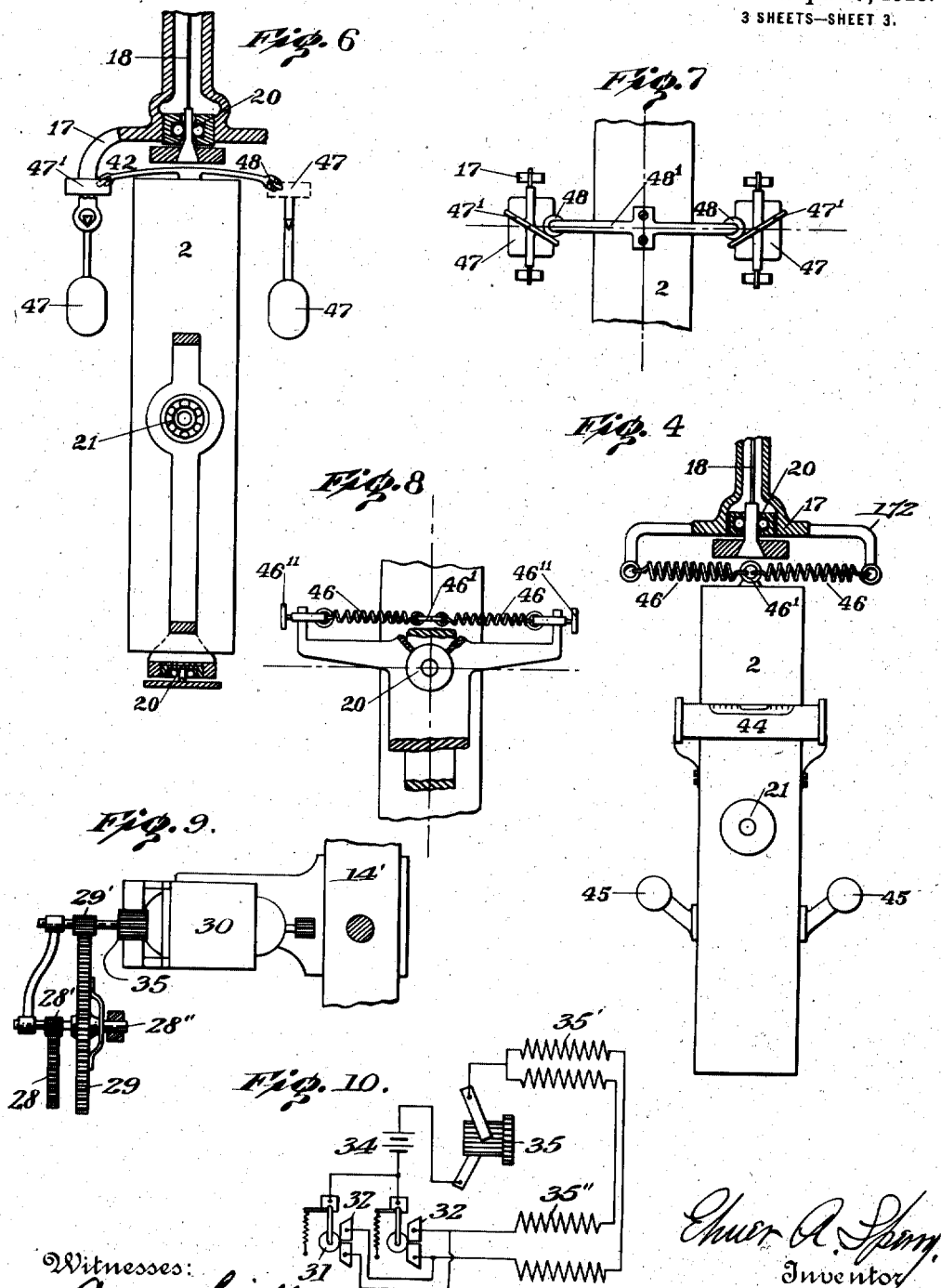

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

GYROSCOPIC COMPASS.

1,279,471.      Specification of Letters Patent.      Patented Sept. 17, 1918.

Application filed June 21, 1911. Serial No. 634,594.

*To all whom it may concern:*

Be it known that I, ELMER A. SPERRY, a citizen of the United States, residing at Brooklyn, in the county of Kings and State of New York, have invented new and useful Improvements in Gyroscopic Compasses, of which the following is a specification.

The gyro-navigation equipment forming the present invention embodies a number of features including master, and may also include repeater, azimuth indicators, one or more of which may be power driven; the employment of an entirely new principle consisting in utilizing a rotating wheel and attached parts, as its journal frame or wheel casing, and in simultaneously controlling its movements in a plurality of planes, these movements being so effected as to produce on the one hand a practical compass and on the other hand to accomplish a number of other functions essential to the proper operation of the gyroscopic compass, upon moving vehicles. To this end I have introduced a new organization known as an azimuth or azimuth moving unit organized to at once develop the requite directive power from the rotation of the earth by a new process which I denominate positive orientation which effects a quick settling of the instrument upon the meridian and which also operates by a new method to extinguish oscillation in azimuth by a partial suppression of freedom of the gyro wheel about the vertical axis, thus combining in the present invention means for introducing stresses or movements in both elevation and azimuth and means for quickly reaching true meridional position, substituting mechanical suspension for liquid or mercury floats and affording marked advantages generally in a number of structural and operating details connected with the various features going to make up a practical instrument. One embodiment of my invention, by way of example, will now be specified and shown and the novel features pointed out in the claims.

The work of Leon Foucault in the middle of the last century upon the unique instrument produced by him "after eight years of assiduous superintendence" and to which he gave the name "gyroscope," because as he states, its varied operations "depend upon the rotation of the earth and are but varied manifestations of such rotation," reveals many very interesting and significant statements, upon careful scrutiny, and some far reaching deductions.

The work of this savant on the pendulous gyro with two degrees of freedom is well known and has been followed by many and while a compass on this principle is found to work on land, when placed on a moving body it is found to respond as any pendulum will to acceleration and deceleration pressures and to other numerous disturbances. This latter difficulty and the oscillation which it sets up are very serious draw-backs to its use at sea.

A very significant statement and one which seems to have been wholly overlooked in its bearing on the subject of gyroscopic compasses was communicated by Foucault with regard to his apparatus having 3 degrees of freedom.

This is contained in a document prepared by him in October, 1852, and reads as follows:

"One should understand, from the little that we have said of the construction of the apparatus, that this tore is supported by a sort of Cardan's suspension, analogous to that which supports chronometers and ship's compasses, with this difference only that the two concentric circles, instead of being in the same plane, are normally or in their average position, perpendicular one to the other. One of them plays round a horizontal axis represented by the two knife-edges arranged precisely in one straight line, while the other is movable about a vertical axis represented by a suspension consisting of a torsionless filament. If, at moment we put it in rotation, this body by its axis points at a star in the sky, during the whole time that the movement (spin) lasts this axis will remain pointing toward the same point of the firmament, and this in virtue of the inertia of matter, or for the very good reason that it is incapable of displacing itself or of altering its direction by itself. If, therefore, we select a suitable star, or if we aim at one of the points of the heavens which appear to be moving most quickly, the axis of rotation when carefully examined, will be found to share the same apparent movement and will give emphatic evidence of the earth's movement. Of course, one should not point the axis in the direction of the polar star, because this star, not having any apparent movement, the instrument would act similarly and not indicate the earth's motion."

The question was long ago asked by me what better compass could one wish than that suggested by the last sentence; it orients perfectly and by adopting this form of suspension, with three degrees of freedom it is found possible at the same time to do away with the evils and errors introduced by "ballistics" and to neutralize the acceleration pressures and also oscillation with one and the same additional device.

Theoretically, as Foucault pointed out, a spinning gyro mounted for three degrees of freedom maintains constant the direction of its axis in space; and therefore if the gyro thus mounted, or even when mounted so that its movement about a horizontal axis at an angle to its spinning axis is partially suppressed, be placed with its axis pointing north and south or in the plane of the meridian, it should remain in this position so long as the gyro wheel continues to spin, no matter whether the gyro and its mounting, considered as a whole, be stationary relative to the earth, or in motion. When the gyro apparatus is stationary relative to the earth, the gyro axis does remain fixed in space; but when the gyro apparatus mounted in either of the ways just described is in relative motion, as for example when mounted on a moving vehicle such as a ship, movements of the vehicle acting directly and also acceleration and deceleration pressures caused by the various movements of the vehicle are communicated, by reason of the friction necessarily existing to some extent between the parts of the gyro's mounting, to the gyro wheel itself, upon which the said pressures are thus indirectly impressed in the form of disturbing torques of varying magnitude. These torques tilt the gyro axis and cause precession of the gyro into new positions where, in each instance, the axis assumes and tends to maintain a new direction in space. As a consequence, the gyroscope either having three degrees of freedom, or with one degree partly suppressed as described, will, if left to itself on a vehicle having variable speed, ultimately cease to indicate the meridian or any other chosen direction in which its axis was originally set, and will be erratic and untrustworthy. Moreover, such acceleration and deceleration pressures serve to exaggerate the oscillations which are found in practice to characterize a freely suspended gyro under all conditions; and the periods of these oscillations are so excessively great that apparatus subject to them is almost useless for the purpose of a compass.

However, when a gyroscope mounted for three degrees of freedom is combined, as in the present invention, with means for accomplishing positive orientation and for minimizing oscillations, a practical compass apparatus results which is accurate and dependable under all conditions of service.

In describing the gyro of the present invention as having three degrees of freedom I do not mean to imply that such freedom is absolute, but rather that the gyro may be non-pendulous. As a matter of fact, as will more fully hereinafter appear, freedom of motion about one or more axes is restrained or suppressed to a certain extent for the purpose of developing a positive orienting force. Considered by itself, the gyro of the present invention, in its most advantageous embodiment, may be in indifferent equilibrium; that is, the three axes about which it can move may intersect substantially at its center of gravity. According to the present invention the disadvantages inherent in the ordinary pendulous gyro, due largely to its being directly affected by acceleration pressures, are avoided; and by providing what may be termed latent restraining means for developing a positive orienting force, the erratic performance of the ordinary gyro having three or even only two uncontrolled degrees of freedom is transformed into perfectly dependable indicating action. At the same time all the important advantages of the pendulous gyro having but two degrees of freedom are retained in the present apparatus, and notably the tendency of the gyro always to seek the north. This is brought about by employing means, herein shown as structurally separate from or external to the gyro and its universal movement support but operatively connected thereto, for partially limiting and constraining the gyro axis to movements largely in one plane which, in practice is a horizontal plane. The restraining means, in its most advantageous form, should be normally without effect on the freedom of the gyro, coming into play only when the gyro tends to wander from its proper position. As a matter of fact a gyroscope on a moving vehicle such as a ship does not, in general, point exactly north, the error being variable and depending as I have discovered, upon the speed, course and latitude of the ship. A device for correcting the apparent readings of gyroscopic compasses is described and claimed in my copending application Serial No. 634,595 of even date herewith.

The instrument of the present invention comprises means for developing and applying a positive force tending to tilt the axis of the gyro-wheel one way or the other the moment the meridional position is departed from in the slightest degree. I have found how to utilize this means to produce a positive stress which is applied direct to the wheel or its journal frame or casing, not simply about one equivalent axis as has heretofore been the universal practice in attempts to solve this problem, namely the horizontal axis, but simultaneously about two equivalent axes lying normal to each other, the second being the vertical axis of orientation. There are, of course, different methods of carrying this important double function into effect. I shall confine my description to the preferred embodiment of one or two methods, selecting those most easily understood. Let us now suppose that near the suitably suspended gyro wheel casing we provide a suitable rigid part close at hand but structurally separate from the gyro to which first a constantly operating self-centering or centralizing connection is made, and second, a simple device, such as a retractile spring or pair of springs are attached. It is found that the springs or their equivalent means constantly restore the wheel and frame to their central position by utilizing its own motion or tendency to move; and what is probably most important of all, it is found that, by selecting an exact point of attachment and one which is to the correct amount eccentric to the vertical axis, a positive and automatic orientation may be introduced whereby the wheel is very quickly returned in azimuth to the meridian as soon as the axis tends to tilt, all this being brought about by the proper relation of some three forces acting in conjunction. Thus, an entirely new element has been introduced into gyro compass operation, viz: that of forced and positive orientation brought about by an operating mechanism of a predetermined activity and moment connecting the directive factor of the compass with a relatively immovable or stationary part, such part serving as an anchor or abutment for developing the necessary force reactions.

It will be readily seen that I have thus secured a simple gyro compass and for the first time in the history of the art, a forced and greatly accelerated orientation coupled with perfect freedom from numerous disturbances and errors above pointed out for it is clear that a part for instance in a state of neutral equilibrium or "indifferent equilibrium", as Foucault forcibly puts it, cannot respond to the disturbances named owing to the fact that it is not possessed of ballastic properties which is the source of the difficulty. One detail remains to be added to make the apparatus complete, viz: that the anchor should turn around in azimuth with the gyro wheel so as to be always on hand to operate as a base for the positive orienting, restraining and correcting element. In avoiding mercury floats and employing Foucault's filament suspension, it is also necessary that no torsion should accumulate therein as the ship turns. To provide against this a sensitive and simple follow-up device has been adopted which instantly responds to the slightest azimuth movement of the wheel and therefore never permanently changes its azimuth relation therewith, thus accomplishing a number of essential functions among which are its use as the anchor for the positive orientation and correction element and at the same time as a support for the torsion suspension whereby the two ends of the torsion element practically always move together, barring a trifling lag existing for an instant between them and before the responding member has caught up, amounting usually to less than one-tenth degree. Therefore no permanent torsion can exist and the suspension is always held in the condition of maximum sensitiveness and in readiness to instantly respond equally to motion in either direction. The rigidity of this supporting and anchoring part will be seen to be more than sufficient for all needs when it is stated that it is geared solidly to a stationary part secured to the supporting body and positively driven as by a power motor.

The acceleration pressures mentioned are due principally to three causes, first, that of getting under headway, or while stopping either forward or backward; second, centrifugal forces in turning, while moving in either direction; and third, the acceleration pressures emanating from oscillation where the compass is located at a distance from the center of such oscillation.

For purposes of illustration of one method of carrying out my invention, I have selected embodiments of the various features which are detailed in the accompanying drawings, in which:—

Figure 1 illustrates an elevation, partially in section and partially diagrammatic, of the master instrument with some parts removed.

Fig. 1^A shows in plan a pointer between the wheel and the element.

Fig. 1^B is a fragmentary view illustrating a method of supporting the pendulum shown in Fig. 1.

Fig. 2 is a vertical section through the journal frame or case, and the gyro wheel showing only a fragment of the motor and windings especially, the heat absorbing means for the motor coils. This section is taken at right angles to the section shown in Fig. 3.

Fig. 3 is a vertical section of the gyro wheel and casing, the section being taken on the center line of Fig. 1 and at right angles thereto.

Fig. 4 shows restraining and centralizing means as between the frame and the element in elevation.

Fig. 5 shows a plan of an arrangement of one pair of one form of the azimuth controlling contacts.

Figs. 6 and 7 are respectively an edge elevation, partly in section, and a plan view of a construction alternative to that shown in Fig. 4.

Fig. 8 is a plan view of the structure of Fig. 4.

Fig. 9 shows azimuth motor and gearing for driving the element.

Fig. 10 shows a wiring diagram for azimuth motors and contacts.

Figs. 12 and 13 are alternative form of moving contacts wherein one may be power driven.

Fig. 14 shows section of fraction of bottom of journal frame of the structure shown in Fig. 1.

Fig. 15 shows the detail of one form of ball bearing for the gyro wheel.

Fig. 16 shows the negative pressure tank for exhausting the gyro wheel casing.

The directive factor of my gyro-navigation system consists essentially of a spinning mass or wheel, 1, which is supported upon a suitable journal frame or casing, 2, and which acting in conjunction with a stator, 3, constitutes an induction motor. This wheel is preferably mounted upon a slender and easily deflected shaft, 4, so as to permit the mass to revolve about its own center of gravity. An anti-friction bearing or bearings, 4', is shown centrally located along the line of the shaft, 4, and surrounding the hub of the wheel, 1. This bearing receives the pressure when the deflection of shaft, 4, is excessive. Owing to these deflections, the shaft is provided at its ends with a special form of bearing, 5, permitting of free universal motion to accommodate such deflections. This is accomplished in a very practical manner by the spherical surfaces 5', against which anti-friction rollers or balls 5ª directly operate. The balls may be held by a retainer 5ᵇ (see Fig. 15). 5" shows a discharge duct for preventing the accumulation of foreign material in the bearing. These journals are lubricated from an oil reservoir, 6, located near each journal, the reservoirs being equalized through a pipe or duct 7, which passes out around the wheel. Absorbent wicks 6' are used to carry the oil from the reservoirs up to the bearings 4. The windings or electric coils, 3', of the motor within the casing are brought into intimate contact with the interior surface of the casing or projection or part thereof. This is accomplished, for example, by means of the teeth, 3", which extend from the casing 2 between the stator coils 3'. An exhausting nozzle or nozzles, 8, lead to the interior of the casing for evacuating the same for the purpose of greatly reducing the power required in spinning the wheel. The preferable location for such a nozzle is near the axis of support, 21, so that little disturbance to the equilibrium of the parts occurs during exhaustion. A vacuum gage is shown at 8' as a means of greatly reducing the time of any such disturbance. I prefer to use the exhaust tank, 73, (Fig. 16) either with or without the vacuum pump 73', the flexible hose of which need be only attached to nozzle 8, for an instant during exhaustion while the tank and casing establish an equilibrium of their negative pressures within the casing and also, within the tank. It is on account of this evacuation that certain difficulties are encountered; it becomes necessary to provide special means for drawing off the heat inevitably developed in the motor, and especially, its coils, 3'. Effective means have thus been found by utilizing conduction, for this purpose drawing heat from the coils to the case and dissipating it by employing exterior ribs 2' where necessary. This is especially important as there is no opportunity for convection or air wash interior to the evacuated case, nor is radiation effective owing to the low temperatures present.

The ordinary Cardan ring, 10, is suitably supported by standards, 11—11, holding electrical terminal blocks, 12, for conductor cables, 13 and 13', Fig. 1. Interior to the ring, 10, is the relatively stationary part or spider, 14, consisting of ring 14', and arms 14" supporting a tubular hub, 15, containing the ball journals, 16—16, for guiding the central hollow stem, 16' of the guiding and supporting element or phantom 17. Surmounting the hub, 15 is a cap 15' within which is the support for the torsion suspension, 18. This support rests upon the top of the stem, 16', the upper part, 17' being adjustable about a vertical axis as by screws, 17" located in projections from the lower part 17'. The suspension, 18 is also adjustable vertically as by the nuts, 18'. The lower end of suspension, 18, supports the gimbal ring, 19, which is pivoted above and below to the guiding element, 17, by the antifriction roller bearings 20—20. Torsion suspension 18 not only serves to support element 19 with the gyro wheel, but operates as a resilient centralizing means between the phantom 17 and the gyro. That is the twist of the wire is so adjusted that element 19 and phantom ring 17 come to rest in the same plane under the influence of wire or wires 18. The gimbal ring and the guiding element are thus capable of coaxial movements in azimuth. The ring, 19, serves to support the journal frame or casing, 2, for the gyro wheel, 1, by horizontal pivots, 21—21, preferably in an approximately horizontal line including or very near the center of gravity of the mass. The casing or frame of the gyro wheel is thus mounted for movement about a normally horizontal axis which is disposed at a substantial angle, in this instance at right angles, to the spinning axis of the gyro wheel; and this angular relation between these two axes is evidently fixed or constant. The gyro-wheel and casing 2 and the ring 19 are thus coupled together for movements in azimuth, but are not directly coupled to the power driven, follow-up element comprising phantom 17, and the parts directly connected thereto, but are free to move in azimuth with respect thereto. For convenience, I term the gyro-wheel and the parts directly connected therewith so as to be moved thereby in azimuth, the sensitive element, while the other parts of the azimuth movable unit are termed the follow-up or guiding element or support. The electric wires, 22, preferably flexible, emerge from the case, 2, and pass to ring, 19, preferably at a point near pivots, 21. From the ring, they are led by tubes, 19' into close proximity to the base of the torsion wire, 18, passing up parallel thereto preferably free from the walls of the stem, 16', thence, down upon such walls and out to the slip rings, 24, which are located between the azimuth turning element, 17, and the stationary part, 14, thence by coöperating brushes, 25, and wiring, 26, to the cable 13, preferably near the fore and aft gudgeon standards, 11, of the Cardan, Fig. 1, to terminal blocks, 12, outside the Cardan ring, 10. The wires passing the various pivots are preferably flexible and may form a helix as at 22. The azimuth-moving unit is supplied with the pointer, scale or divided compass card, 27, preferably attached to the gear-wheel, 28. Said gear 28 is shown as made in the form of an annulus with downwardly extending legs 281, which rigidly secure the gear to the element 17. It will thus be seen that the compass card is not operated directly from the gyro wheel, but is a part of what I term the follow-up system. The compass card coöperates with a lubber line or equivalent indicating means 27' carried by bracket 14'' of the Cardan mounting. Grooved ring 51 is provided for coöperation with the correction device disclosed in my copending application hereinbefore mentioned. Meshing with the gear wheel 28 is a driving pinion 28' fixed to a suitably supported arbor 28'' which also carries secured thereto a gear 29 arranged to be driven by pinion 29' (Fig. 9) fixed to the shaft of the azimuth motor 30. This motor and its driving connections just described serve to turn the element responsively to the relative motions between the wheel, 1, and the element, 17. This is accomplished by coöperating contacts preferably present at least in duplicate, consisting of a wheel or trolley, 31, suitably carried by ring 19', and a double pole contact, 32, (Fig. 1) mounted on element 17 or a part rigid therewith. The plural sets are preferably in multiple arc circuit as shown in diagram in Fig. 10, thus securing reliability of operation and rendering ready replacement or renewal practicable. A handle, 31' or 32' is provided on each and a "dovetail" slot, 33, or pins, 31'', (Fig. 5) serve to secure the contacts in place and render them quickly removable and also, individually adjustable vertically for presenting fresh wearing surfaces to the coöperating contact. This adjustability is secured by making the engagement between the contacts and their attaching means (pins 31 or dovetailed slot 33) sufficiently frictional to hold them in any position of vertical adjustment in which they are placed. The members of each double pole contact 32 are spaced from each other and from other parts of the apparatus by suitable insulation as shown.

34, (Fig. 10) represents a source of electrical supply, 35, the commutator of the motor, 30. 35', one pair of field coils, and 35'', the other pair, connecting respectively to the two segments or poles of the contact, 32, which coöperate with the contact, 31, which preferably is spring pressed, and connected back to the opposite pole of the electrical source, 34. It will be observed that from the insulation between the contacts, 32, the roller, 31, may move on to either one of the contacts and therefore energize either one of the fields 35' or 35''; these being wound in opposite direction will cause the motor to start to run in opposite directions, turning gear wheel, 28, and therefore, the element 17, upon the bearings, or journals 16, within the tubular hub, 15.

Referring to Fig. 1, it will be seen that the trolley contacts are mounted on pins 19'', rising from the gimbal ring, 19, or equivalent part, partaking of all azimuth movements of the wheel, 1, or its journal frame or casing, 2, this movement being relative to the element, it will thus be seen that the azimuth movements of the ring impelled by the motor 30, are brought about or caused by the relative movements between the wheel and the element. In operation since the follow-up element possesses considerable inertia and since the space between the reversing contacts 32 is small, the system shows a strong tendency to oscillate, the motor continually reversing and maintaining it in a state of vibration.

Alternative to the construction of contact shown in Figs. 1, 5, and 10, is another form of rotating contact, 40, mounted on the spindle, 40', properly supported in bearings, and impelled by gear 40'' (see Figs. 12 and 13). Uniform rotation may be imparted to said contact 40 by any suitable means such as motor 401 geared to the contact through a worm and worm wheel 402, bevel gears 403 and a pinion (not shown) meshing with gear 40''. Upon the insulation, 41, are mounted similar cylindrical faces, 41' and 41'', connected to collars, 42, in contact with brushes 42', by means of which the connection from the fields 35' and 35'' is led to the cylindrical faces 41' and 41''. A coöperating contact, 43 (see Fig. 12) is mounted upon the gimbal, 19, as at stem, 19'' for movement relative to the contact, 40, this spring-pressed contact 43 may move from the insulation 41, on to either pole, 41' or 41'' of the contact, 40, thus establishing circuit relations for performing any of the necessary functions in or about the apparatus as the energization of the motor, 30. These contacts are preferably operated in duplicate. It will be seen that the general operation of this contact is the same as that of the main form 31, 32, the brush 43 taking the place of trolley 31 and drum 40 the place of contact strips 32. By constantly rotating the drum, the initial friction in starting the brush 43 to move axially across the drum is reduced, by the simple expedient of never permitting the two parts to attain a relative position of rest.

Driven by some portion of the follow-up system is a transmitter 36 adapted to transmit the readings of the master compass to one or more repeater compasses after the manner described in detail in said copending application. The transmitter is shown as a commutator 39 which is normally held stationary through gear 39' and gear sector 38' on brackets 38. The brushes 37 adapted to contact with said commutator are supported on arms 36' which are secured either directly or indirectly to shaft 28'', which it will be remembered is rotated by the azimuth motor 30. By this means, it will be seen, I throw the work of driving the transmitter on the azimuth motor and thus relieve the sensitive element of a source of friction about the vertical axis. The journal frame or casing 2 is supported for oscillation about a horizontal axis passing through or close to its center of gravity by means of bearings or pivots 21.

At this point attention is called to the fact that an entirely new principle of action is utilized in the present invention as mentioned at the beginning of this specification. Briefly it results from supporting the gyrowheel by its peculiar mounting so that in and of itself it will positively stand in space as did Foucault's gyro and therefore show the rotation of the earth as his did. To this end the wheel, 1, axle, 4, journal frame 2, and connected parts should not be pendulous, that is, when the wheel is not spinning, it should not vibrate or oscillate, but preferably remain at rest in any position in which it is placed about its horizontal axes of support, indicated by pivots 21—21. To fulfil the function of a compass for vehicles it is essential that the wheel frame, 2, shall be controlled or restricted, not alone in one plane or with respect to one of its three degrees of freedom as has been wrongly heretofore stated in this art, but also that it be controlled or restrained in a plurality of planes or with respect to at least two of the said degrees of freedom including especially positive control about its vertical axis. It is clear that this restraint, especially in two planes, cannot be imposed by simply imparting ballistic properties, or the properties of a more or less sensitive balance, to the wheel and frame without a peculiar mounting independent of the ordinary three degrees of freedom as has also heretofore been supposed, but when operating under these conditions another independent and relatively stationary and more or less rigid part should be positioned near at hand to be laid hold upon by suitable and preferably yielding connecting devices. Moreover if the restraining powers or operating moments of these devices are properly proportioned not only to the masses but to the gyroscopic moment of the rotating wheel, then practically all, instead of a part only, of the functions will be fulfilled and the component factors will be properly and operatively introduced so that a very important and entirely novel function is secured, viz: positive orientation of the gyrowheel which will operate with full effect to neutralize oscillation and cause the compass to settle quickly upon the meridian and hold this position notwithstanding the disturbing factors due to its use upon moving vehicles.

Moreover, so long as the suppression of freedom about two of the three axes of oscillation of the gyro is in proper proportion to the gyro moment, as stated, the gyro casing itself, or its directly connected parts, may be to any known extent pendulous so long as the desired values of suppression are not exceeded about either of the axes representing two of the said three degrees of freedom. Foucault's gyro, supported with three degrees of freedom, was pendulous to various degrees by suitably adjusting certain weights attached for the purpose to his apparatus. Whatever plan is pursued it is of course essential that all these functions be performed by mechanism not too complex in structure. As a result of a very large amount of research and experiment I have at last found means of great simplicity considering the positive orientation and all the other functions it is called upon to perform—simple because it consists of a single part or element, as for instance the centralizing torsion, 18, and springs, 46, or their equivalent extending between frame 2 and any independent and comparatively rigid part, as part, 17, which it will be remembered is power driven and moves with the frame about a concentric vertical axis. The method employed to perform these functions should restrain the wheel casing and should also constantly tend to return the same to its central or some predetermined position in both planes as described. It is found if this restraint can at the same time operate to hold the wheel central in the vertical plane upon its vertical axis as bearings, 20 and 20, and torsion suspension 18, and furthermore, when the restraining or centralizing moment of the mechanism bears a certain predetermined relation to the gyroscopic moment of the wheel, then there is developed a very useful function which has a two or three-fold object and purpose as described, namely in addition to the above to dampen out and extinguish practically all of the tendency to oscillate in azimuth on a part of the unit as a whole, or the part bearing the scale or pointer.

The operating moment of the restraining means about the equivalent horizontal axis, normal or at a substantial angle to the spinning axis, may be defined as bearing a definite relation to the normal gyroscopic moment of the wheel as hereinbefore stated. In this connection it should be borne in mind that the wheel itself is always capable of developing a certain gyroscopic couple from the impressed forces derived from the earth's rotation at any given latitude.

The acceleration pressure in the north-south direction, or direction having a north-south component developed by the restraining means (which for the purposes in hand may be considered pendulous) should introduce such a tilting action upon the gyro wheel as will cause it to precess to approximately the same off-meridional or new position in azimuth as the wheel itself will naturally reach by the application thereto of the terminal speed attained during such acceleration. It is found that, to accomplish this result, the torque exerted about the horizontal axis of the gyro upon said gyro becoming inclined is proportioned so that the period of oscillation about the meridian in azimuth is approximately the same as the period of a simple pendulum whose length is equal to the radius of the earth.

The discovery of this relation introduces a new and valuable feature in the gyroscopic compass art and solves an important problem with reference to the application of the gyroscopic compass to navigation, or to moving bodies generally, and furthermore serves to emphasize the importance of the horizontal pivots described, or, in fact, any equivalent method of obtaining this degree of freedom to which it imparts new importance.

The off-meridional or new position mentioned is not due to the application of the speed or projection through space as such, because gyroscopes do not respond to unilinear motion, but to the fact that this motion is in reality angular motion about the earth's center, and to obtain its reactional value upon the gyro wheel these motions must always be reduced to virtual earth's rotation, peripheral projection, or to angular velocity about a remote axis, viz: at a distance of the earth's radius.

The definition of the effective moments about the vertical axis due to the restraining means herein described or in fact to any restraining means which I may employ, is much more involved but may be stated with sufficient accuracy for the present purposes as follows: In one mechanism constructed in accordance with this invention and which yields excellent results, this effective moment about the vertical axis is on the order of 1/35 of the magnitudes of that applied about the horizontal axis which has just been described. As stated, the moments about the vertical and horizontal axes are simultaneously applied.

What has been stated above with reference to the importance of this discovery serves to still further emphasize the importance of the dual, double or simultaneous use of my restraining factor which solves an additional important problem in the application of the gyroscopic compass to navigational purposes, namely that of "damping out" or, what is more important, suppressing at inception all oscillations which otherwise would be set up by any one of the various motions of the vehicle or ship carrying the compass; when it is stated that these oscillations are of a wide and irregular amplitude and that their period is exceedingly long, in fact more than an hour, the utterly useless nature of a compass obsessed by such motions and oscillations will at once be seen and it has been found in service that such a compass is entirely useless.

Various methods for carrying this into effect may be resorted to, for instance, such as is shown in Figs. 1, 4, 6, 7, 8 and 14. Thus Figs. 4 and 8 show the centralizing springs, 46—46, with their outer ends anchored in projections 17$^a$ from the element 17, and attached to the frame 2, at point 46', which will be seen from Fig. 8, to be eccentric to or outside of the vertical gimbal axis 20—26 and from Fig. 4 also eccentric to the horizontal gimbal axis. These springs are rendered adjustable as by screws, 46''.

An alternative construction is shown in Figs. 6 and 7 where two pendulums, 47 and 47 are shown as supported from the element, 17, and provided with inclined bearing faces 47', each coöperating with the rollers 48, supported by the journal frame 2, as by arms 48' secured thereto. It will readily be seen that the wheel in this case is not only restrained and returned to its central position vertically, but is also restrained about its vertical axis or journals, 20, and suspension 18, as is the case when springs 46 are employed. The attachment, however, to the frame 2, in this case may be central rather than eccentric, since the requisite torque about both the horizontal and vertical axis is exerted on the casing through the common medium of the arms 48' and inclined surfaces 47'.

Another form of yielding means for limiting motion between the element or phantom 17 and the wheel frame or casing, is shown in Figs. 1 and 14. This general form of connection is found in actual practice to have special advantages. The practical effect produced by this arrangement is broadly similar to that attained with the other constructions above described; but the arrangement of Figs. 1 and 14 is simpler and, in some respects, more satisfactory than the others. In this embodiment, the springs 46 are replaced by gravitational means comprising a single pendulum 49, which is in the form of a bail hung at its opposite ends from the element 17 by knife edge suspensions 49'. Normally, these suspensions are best substantially in alinement with the horizontal axis of tilt, 21—21, of the journal frame or casing 2; or, more strictly speaking, they lie in substantially the same horizontal plane as the axis 21—21, inasmuch as it is essential to the proper functioning of the device that there be relative motion in this plane between the wheel and element 17. The pendulous bail 49 is arranged to engage the wheel frame or casing, or a suitable extension thereof, at one side of its vertical axis through the agency of some form of loose or yielding connection permitting a certain amount of relative movement between the casing and bail. One embodiment of such means comprises a member 49$^b$, one end of which is attached to the wheel casing 2, while the other projects into a slot 49' in the bail 49. The amount of play permitted by this slot, and consequently the activity of the connecting mechanism, is regulable as by adjusting stops 49$^c$. Adjustment may also be secured by the use of adjustable weights 49$^a$ attached to bail 49 by being threaded on a downward extension 49o. By varying the position or mass of the nuts, the ballistic effect of the bail may be adjusted at will. Similarly, adjustment of the spring connection shown in Fig. 8 may be secured by manipulation of thumb screws 46''.

Rising from the gimbal or attached to the pin, 19'' thereof shown on the right in Fig. 1, is a pointer 27'' (Fig. 1$^A$) for indicating the relative movement in azimuth between the wheel and the element, as for instance, by coöperating with the inner margin or portion of the scale 27. This indication is helpful as a check on operation and in making the azimuth adjustment of the torsion suspension.

The part 27'' for indicating the relative movement serves to aid in keeping the wheel and element in their proper azimuth relation.

The Cardan mounting of the instrument as a whole serves the usual purpose of preventing rocking or angular motions of the vehicle or support from being communicated to the instrument. The relatively stationary part, 14, is supplied with one or more balancing weights, 71, Fig. 1. The balancing weight, 71', Fig. 3, attached to the journal frame serves to obtain the proper equilibrium of the latter, and the indicator of elevation such as the level 44, Fig. 4, aids in determining when the proper equilibrium has been established.

The handles 45, aid in the quick setting or finding of the meridian when the wheel is spinning. By means of these handles coöperating with the level, it has been possible to find the meridian in a comparatively few seconds when the bearing is known, and in only a very few minutes when the bearing is unknown. When I place my level on the east side, the direction taken by the bubble from the effect of the earth's motion, indicates the direction of the meridian. It will be observed that the movements of the wheel in azimuth cause or produce movements of the element through the operation of the contacts used and that this following effect may be brought to a high point of perfection or exactitude.

As stated the plurality of contacts 31, 32 aid in removal or adjustment of one or more without the interfering with continuous operation. The torsion suspension and also the anti-friction pivots tend very materially to increase the sensitiveness of the instrument.

For driving the repeating compasses and carrying a mass which is heavy when compared with an ordinary magnetic needle with sufficient delicacy of action, it is necessary that the element which supports the wheel and connected parts, move therewith, whereby the amount of torsion in the torsion suspension which is located between these parts is reduced to a minimum in practice to a fraction of a single degree and therefore can never be impaired or introduce a resisting factor from over-twisting. The rotating or moving contacts aid materially in reducing the friction and resistance to the relative motion between the wheel and the element.

The restraining or centralizing mechanism connecting the wheel with the guiding element utilizes the fact that these masses are entirely independent as to movement, and causes them to so co-act through the connecting mechanism that the disturbing influences of the movement of the vehicle are prevented from causing undue oscillation of the azimuth pointer or circle. With this mechanism, consisting of a pendulous mass or masses, the gravitational components may, of course, be utilized as between the independently moving element and wheel for the purposes above stated.

To accomplish this purpose each element performs several distinct functions, not only has the restraining and orientation mechanism to be attached at the correct distances from the axis of oscillation but they must bear certain exact relations to the weights and masses involved; what is equally important they must bear certain definite relations as to their positive operating moments to the gyroscopic moment of the spinning wheel, 1, and it is only when these various effects are introduced in their proper relation that the results that have been carefully pointed out herein shall be achieved.

Operating the wheel, 1, *in vacuo*, introduces difficulties in keeping the motor sufficiently cool and at the same time sufficiently small and light so that the suspensions and pivots of the character described may be employed.

It was only after much research that the combination herein specified has been reached, solving both problems,—preventing overheating by the phenomena of conduction, by bringing the coils into intimate contact with the interior surface of the casing or projections thereof, so that the exterior surface of the casing may radiate the heat. This is not possible with coils or windings that rotate, so that a form of motor has been found that has no moving windings or coils and all the coils that it has are stationary so as to be susceptible to the treatment specified. In this way, it has been found that a vacuum of more than 29 inches can be maintained continuously under service conditions and the motor be made sufficiently light to adapt itself to the situation through practical suspension of the character specified.

The using up of the lubricant by one journal of the wheel faster than the other, or by careless filling of the lubricating receptacles, 6, on each side of the wheel was found to throw the wheel out of equilibrium and disturb the accuracy of the instrument. This was overcome by the connecting channel, 7, which passes around the wheel and equalizes the lubricant as between the two receptacles.

Difficulty was experienced in getting the wheels properly balanced, which, however, was finally overcome by mounting the wheel upon a slender spindle, 4, and allowing the mass of the wheel to gyrate about its center of gravity. This immediately introduced difficulties with the journals, which are required in this instance to run out of true axial alinement, but a universal mounting was finally devised which overcame this difficulty by employing spherical surfaces and when roller bearings, 5, are used, the rollers operate directly upon the spherical face, 5', as indicated in the drawings, permitting entire freedom of operation out of true axial alinement on the part of the journals. The wick oiler 6' illustrated in the drawing affords all lubrication necessary to those journals in continuous service.

The journal frame, or casing, 2, is as a matter of fact, lighter than the wheel. Its natural period therefore, establishes the critical period of resonant vibration in spinning. This mass having considerable freedom of movement still further aggravates the operation of the instrument at the "critical" speeds; that is, at the speeds of maximum vibration. To overcome this, the central bearing, 4', normally out of contact, is provided to restrain the relative movement between the casing and the wheel at times of the critical speed and is found to entirely overcome this difficulty which is serious with my large comparatively slow-moving wheels which I prefer to use in these instruments.

By employing as electrical conductors for the spinning motor, flexible wires and then disposing them parallel to and in proximity with the various pivots, and also running them parallel and reasonably close to the torsion suspension it is found that these wires do not interfere in the slightest with the required sensitiveness to relative movement of the parts between which they pass.

The shaft must be fixed longitudinally. Owing to the presence of the motor the temperature of the parts varies, resulting in expansion of these parts; strains are thus introduced through the running surfaces causing undue wear, especially where the shaft is fixed at both ends. To avoid this the shaft is fixed at one end only but as it expands the center of gravity is found to move with reference to the casing, and what is more important the axis of its support; these changes causing alterations in the azimuth reading.

The gyro wheel is set spinning and the casing swings itself or is suitably moved as required to bring the gyro axis into meridional position. Oscillations of the gyro are promptly damped by the reactions of the restraining means yieldably anchoring the gyro casing to the relatively stationary phantom or guiding element, which latter conveniently serves also, in part, or a supporting element. These reactions produce slight tilting of the gyro axis, causing the gyro to precess back to its proper position. If for any reason the gyro is deflected to such an extent that its motion relative to the phantom is sufficiently great to move the connecting electrical contacts from neutral position, assuming such means to be employed, the azimuth motor is actuated and moves the phantom in the proper direction to develop a correcting torque on the gyro. When the ship changes its course, the phantom, being solidly geared to a part which may be considered fixed in position relative to the ship, tends to turn with the ship; but in attempting to do so it moves relatively to the gyro and thereby displaces the electrical contacts from neutral position, actuating the motor which thereupon moves the phantom in a direction reverse to that of the ship's turning. In this way the anchoring phantom or supporting element is always maintained in substantially the same position relative to the gyro.

While it is designed to use the various features and elements in the combination and relations described, some of these may be altered and others omitted without interfering with the more general results outlined and the invention extends to such use.

I claim—

1. Gyro navigation apparatus for a moving vehicle, as a ship, comprising, in combination, a gyro wheel, a frame wherein said wheel is mounted for movement about a spinning axis, means whereby the frame is mounted for movement about an axis approximately horizontal and at a substantial angle to the first named axis, means whereby the system comprising the parts already named is mounted for movement about a vertical axis of orientation, and yielding means arranged to coöperate with the wheel frame for partially suppressing its movement about said vertical and horizontal axes.

2. Gyro navigation apparatus for a moving vehicle, as a ship, comprising, in combination, a gyro wheel, a frame wherein said wheel is mounted for movement about a spinning axis, means whereby the frame is mounted for movement about an axis approximately horizontal and at a substantial angle to the first named axis, means whereby the system comprising the parts already named is mounted for movement about a vertical axis of orientation, and yielding means arranged to coöperate with the wheel frame for partially suppressing movement of the wheel about the second and third axes above named.

3. Gyro navigation apparatus for a moving vehicle, as a ship, comprising, in combination, a gyro wheel, a frame wherein said wheel is mounted for movement about a spinning axis, means whereby the frame is mounted for movement about an axis approximately horizontal and at a substantial angle to the first named axis, means whereby the system comprising the parts already named is mounted for movement about a vertical axis of orientation, and yielding means arranged to coöperate with the wheel frame for partially suppressing movement of the wheel about two of the said axes, the turning moments of the said suppressing means about the said two axes being unequal.

4. In a gyro-compass the combination with a main support, of an azimuth movable unit suspended therefrom, comprising a supporting element, a gyro-wheel, a journal frame for said wheel, and means for pivotally supporting said frame from said element for azimuth movements relative to said element.

5. In a gyro compass organized for positive orientation, an azimuth-movable unit comprising a supporting element, a gyro wheel, a frame wherein said wheel is mounted, means whereby said frame is pivotally connected with said element for movement about a horizontal axis at an angle with the spinning axis of the wheel, and means extending between the frame and the element and arranged to yieldingly resist movement of said frame from a predetermined position about a vertical axis.

6. In a gyro-compass, the combination with a main support of an azimuth movable unit supported therefrom comprising a guiding element, a gimbal carried by said guiding element and movable relatively thereto, a gyro wheel, a suitable journal frame wherein said wheel is mounted, said frame being pivoted within said gimbal for movement about a horizontal axis disposed at an angle with the spinning axis of the wheel, and a yielding connection between said frame and said element.

7. In a gyro compass organized for positive orientation, an azimuth-movable unit comprising a guiding element, a gyro wheel, a journal frame wherein said wheel is mounted, means whereby said frame is pivotally connected with said element for movement about a horizontal axis at an angle with the spinning axis of the wheel, said frame being capable of movement relative to said element, a restraining connection between the frame and the guiding element, and means for positively turning said guiding element in azimuth.

8. A gyro navigation apparatus comprising a gyro wheel, means whereby said wheel is mounted to spin on a normally horizontal axis and to move about a second horizontal axis at a substantial angle to the spinning axis and also to move about a vertical axis, and means for restraining the free movement of said gyro, said means being adapted to exert a compound torque on said gyro relative to such second horizontal axis and the vertical axis.

9. In a gyro compass an azimuth-movable unit comprising a guiding element, a gyro wheel, a journal frame carrying the gyro wheel and pivoted on said guiding element for azimuth movements relative to the latter, and a plurality of restraining connections between the frame and the element for limiting the said relative movements in azimuth.

10. In a gyro compass an azimuth-movable unit comprising a guiding element, a gyro wheel, a journal frame carrying the gyro wheel, a gimbal connection located between said frame and said element and permitting relative movement between them about two different axes, and means for controlling such relative movement, said means comprising a part mounted upon the guiding element and engaging the frame at a point lying in the general plane of the gimbal but eccentric to one of the gimbal axes, said means being arranged, upon relative movement between said frame and said element, to exert torque about the other axis of the gimbal.

11. In a gyro compass organized for positive orientation, an azimuth movable unit comprising a guiding element constrained to move about an axis, a gyro wheel, a journal frame carrying the gyro wheel, means whereby said frame is pivotally supported within said element for movements relative thereto about the same axis, and mechanism connecting the journal frame and the element for setting up stresses between them by reason of such relative movements and thereby tilting said journal frame.

12. In a gyro compass organized for positive orientation, an azimuth-movable unit comprising a pendulous guiding element, a suitable support therefor, a gyro wheel, a journal frame carrying the gyro wheel, means whereby said frame is pivotally connected to said element for co-axial movements relative thereto, and yielding means extending between the journal frame and the element for setting up stresses between them by reason of such relative movements.

13. In a gyro compass, a gyro wheel, a journal frame wherein said wheel is mounted in substantially static equilibrium with its axis normally horizontal, a gimbal supporting means for the frame permitting rotation of the frame about a plurality of axes including a vertical axis, an auxiliary part movable about an axis coincident with one of the axes of said means, and a yielding connection between such auxiliary part and the frame, engaging the latter at a point eccentric to another of the said axes of the gimbal and capable of effecting positive orientation of the gyro wheel.

14. Gyro navigation apparatus of the character described comprising a Cardan mounting, a gyro wheel, a casing wherein said wheel is mounted, means carried by said Cardan mounting for supporting said casing for movement in azimuth and in elevation, said means including a power driven member arranged to follow the apparent arc-in-azimuth movement of the gyro wheel and casing, a divided scale carried by said member, and a member carried by said Cardan mounting and coöperating with said divided scale.

15. Gyro navigation apparatus of the character described comprising a Cardan mounting, a gyro wheel provided with a casing, a guiding and supporting element carried by said Cardan mounting, and movable in azimuth, means for suspending said casing from said element for movement relating thereto in azimuth and in elevation, and means connecting said element and said casing for limiting their relative movements.

16. A gyro navigation apparatus of the character described, comprising a gyro wheel, a casing for the wheel, means whereby said casing is mounted for movement about a plurality of axes, a compass card controlled by said gyro wheel, and means independent of the card and controlled by the movements of the said wheel casing, for indicating deviation of the gyro wheel from its exact meridional position.

17. In a gyro compass, an azimuth-movable unit comprising a guiding element, a gyro wheel, a journal frame wherein the gyro wheel is mounted to spin about a normally horizontal axis, means whereby said frame is pivotally carried by said element for movements relative to the element both in azimuth about a substantially vertical axis and also in elevation about a horizontal axis located at a substantially fixed angle to the spinning axis, and an indicating level tube attached to the journal frame.

18. In a gyro compass, an azimuth-movable unit comprising, in combination movable indicating means for determining angles in azimuth, a guiding element mounted for movement in azimuth, a gyro wheel, a journal frame carrying said wheel, means whereby said frame is pivoted for azimuth movements relative to said element, and means whereby movements of the frame may cause azimuth movements of the element and indicating means for producing positive orientation.

19. In a gyro compass, an azimuth-movable unit comprising, in combination indicating means for determining angles in azimuth, a guiding element connected to said indicating means, a gyro wheel, a journal frame carrying said gyro wheel, means whereby said frame is pivoted for azimuth movements relative to said element, including a torsion suspension coöperating with said element for carrying the frame and means for causing said element to partake of the azimuth movements of the gyro wheel.

20. In a gyro compass an azimuth-movable unit comprising, in combination indicating means for determining angles in azimuth, a guiding element connected to said indicating means, a gyro wheel, a journal frame for said gyro wheel, a torsion suspension connected to said element and carrying the frame, and means for adjusting the torsion suspension and a stationary part independent of said unit for coöperating with said indicating means.

21. In a gyro compass, an azimuth-movable unit comprising in combination indicating means for determining angles in azimuth, a guiding element carrying said indicating means and mounted for movement in azimuth, a gyro wheel, a journal frame for said gyro wheel, and means connecting the journal frame with said element and including means whereby said frame is pivoted for azimuth movements relative to said element and power mechanism for moving the guiding element responsive to relative movement between the element and gyro wheel.

22. In a gyro compass, an azimuth-movable unit comprising, in combination indicating means for determining angles in azimuth, a supporting element mounted for movement in azimuth, a gyro wheel, a journal frame for said gyro wheel, and means whereby said frame is pivoted for azimuth movements relative to said element; a power mechanism for moving said element, and a controller for the power mechanism operated by the relative movements of said frame and said element.

23. In a gyro compass, an azimuth-movable unit comprising, the combination with indicating means for determining angles in azimuth, of a follow-up element mounted for movement in azimuth, a gyro wheel, a journal frame for said gyro wheel, and means whereby said frame is pivoted for azimuth movements relative to said element; a power motor arranged to move said element, a suitably energized electric circuit for operating the motor, and means controlled by the relative movements of said frame and said element for controlling said circuit.

24. In a gyro compass, an azimuth-movable unit comprising, the combination with indicating means for determining angles in azimuth, of a guiding element connected to said indicating means and mounted for movement in azimuth, a gyro wheel, a journal frame whereon said wheel is mounted, and means whereby said frame is pivoted for azimuth movements relative to said element; a stationary part coöperating with the said indicating means, a power motor located between the stationary part and the element for moving the latter, and an electrical controller for the motor arranged to be operated by the relative movements of said frame and said element, said controller comprising a plurality of coöperating sets of electrical contacts and multiple electrical circuit connections for the sets.

25. In a gyro compass an azimuth-movable unit comprising, in combination indicating means for determining angles in azimuth, a guiding element mounted for movement in azimuth, a gyro wheel, a journal frame whereon said wheel is mounted, and means whereby said frame is pivoted for azimuth movements relatively to said element; a stationary part coöperating with the said indicating means, a power motor located between the stationary part and the element for moving the latter, and an electrical controller for actuating the motor, said controller comprising coöperating contacts of which one is movable with said journal frame.

26. A gyro compass for navigation purposes comprising, in combination, a gyro wheel, a journal frame whereon said wheel is mounted to spin about a substantially horizontal axis, means for mounting said frame for freedom of movement in azimuth and also about a second substantially horizontal axis at a substantial angle to the spinning axis, said means being movable in azimuth and means engaging said journal frame for restraining free movement of the gyro about such second horizontal axis, said means being sensitive to acceleration pressures.

27. In a gyro compass, an azimuth-movable unit comprising a guiding element, a gyro wheel, a journal frame for the gyro wheel, means whereby said frame is pivotally connected to said element for azimuth movements relative thereto, and means for restraining the said relative movements, said means comprising a part mounted upon said element and engaging the frame at a point to one side of or eccentric to a turning axis thereof.

28. In a gyro compass, an azimuth-movable unit comprising a guiding element, a gyro wheel, a journal frame for the gyro wheel, means whereby said frame is pivotally connected to said element for azimuth movements and also for altitude movements both relative to said element, such altitude movements being about a horizontal axis at an angle to the spinning axis, and means for restraining the said relative movements, comprising a part mounted upon the element and engaging the frame at a point to one side of or eccentric to both of its turning axes.

29. In a gyro compass, an azimuth-movable unit comprising a guiding element, a gyro wheel, a journal frame carrying said wheel, a gimbal connection between the frame and said element providing for relative movements between them, and means for restraining the said relative movements, said means comprising a part mounted upon the element and engaging the frame at a point lying in the general plane of the gimbal but eccentric to or out of line with the pivots thereof.

30. In a gyro compass, an azimuth-movable unit comprising the combination with suitable indicating means, of a guiding element, a gyro wheel, a journal frame for the gyro wheel, means whereby the frame is carried by said element and pivoted thereto for azimuth movements relative thereto, and mechanism connecting the journal frame and the element for setting up stresses between them for restraining the said relative movements; and a stationary part coöperating with said indicating means.

31. In a gyro compass, an azimuth-movable unit comprising the combination with direction indicating means, of a guiding element, a gyro wheel, a journal frame for the gyro wheel, gimbal means supporting said frame for azimuth movements relative to said element, and including a torsion member whereby said gimbal means are suspended from a part of the guiding element, an electric motor for the gyro wheel, and an electrical circuit connection for the motor comprising conductors arranged substantially parallel to the said torsion member.

32. In a gyro compass, an azimuth-movable unit comprising the combination with direction indicating means, of a supporting and guiding element mounted for movements in azimuth, a gyro wheel, a journal frame for the gyro wheel, means whereby said frame is carried by said element and is capable of azimuth movements relative thereto, and mechanism connecting the journal frame and the element for setting up stresses between them for restraining the said relative movements; and a Cardan mounting on which said unit is supported.

33. In a gyro compass, an azimuth-movable unit comprising a guiding element, a gyro wheel, a journal frame wherein the gyro wheel is mounted to spin about a normally horizontal axis, means whereby said frame is pivotally carried by said element for movements relative to the element both in azimuth about a substantially vertical axis and also in elevation about a horizontal axis at an angle to the spinning axis, and an indicating level tube attached to the east side of the journal frame.

34. Gyro navigation apparatus of the character described, comprising a gyro wheel forming the rotor of an electrical motor, a casing for said wheel, electrical energizing coils arranged within said casing forming the stator of said wheel, and heat conducting means adjacent said coils and in contact with the walls of said casing, in combination with means whereby said casing is mounted for movements in azimuth and in elevation.

35. In gyro navigation apparatus an azimuth-movable unit comprising a movable supporting element, and a sensitive element including a gyro wheel, a journal frame for the wheel and means whereby said frame is pivoted to said supporting element and capable of movements relative thereto, a motor arranged to drive said supporting element, an electric controller for the motor operated by the relative movement of said two elements, said controller including coöperating electrical contacts mounted on said sensitive element and said supporting element respectively and electrically connected to said motor.

36. In a gyroscopic navigational instrument, a gyro-wheel, a shaft therefor, a frame having bearings wherein said shaft is mounted, means whereby said frame is pivoted for movement about a horizontal axis at substantially right angles to that of the wheel, the bearings for the wheel shaft being on opposite sides of the wheel and of the frame axis, a lubricant receptacle adjacent each bearing, and an equalizing conduit extending about the wheel and connecting said receptacles.

37. In gyroscopic apparatus, a gyro wheel, an inclosing casing exhausted of air for the wheel, the surface of said casing being adapted to radiate heat rapidly, and heat-generating energizing means within said casing for actuating the wheel, said means being in intimate contact with the casing.

38. Gyro navigation apparatus comprising a gyro wheel, supported so as to be free to spin about an axis and to move about two other axes, a member arranged for movement relative to said wheel about one of the said other two axes, and means arranged to limit relative movement between said member and said gyro wheel.

39. Gyro navigation apparatus comprising a gyro wheel, supporting means for said wheel permitting the wheel to spin about an axis and to move about two other axes, a member arranged for movement substantially coaxial with and relative to said wheel about one of the said other two axes, yielding means operatively connecting said member with said supporting means, and means for moving said member.

40. Gyro navigation apparatus comprising a gyro wheel, supporting means for said wheel permitting the same to spin about a normally horizontal axis and also to turn in azimuth and in elevation, and including a member arranged to move with the azimuth movements of and relatively to the wheel and means arranged to restrain the relative movements of said member and said wheel.

41. Gyro navigation apparatus comprising a gyro wheel, supporting means for said wheel permitting the same to spin about a normally horizontal axis and also to turn in azimuth and in elevation, and including a member arranged to move with the azimuth movements of the wheel, means yieldably connecting said member and said supporting means and means for positively driving said member in azimuth.

42. Gyro navigation apparatus comprising a gyro wheel, means for spinning the same, a journal frame for said wheel, a gimbal pivotally supporting said frame for movement about a horizontal axis at a substantial angle to the spinning axis of the wheel, torsion means supporting said gimbal in substantially vertical position for angular movement in azimuth, an anchoring or restraining member arranged to turn in azimuth coaxially with and relatively to said gimbal, means limiting the relative movements of said restraining member and said journal frame, and means for positively driving said restraining member in azimuth.

43. Gyro navigation apparatus comprising the combination with a Cardan mounting, of a supporting spider carried on said Cardan mounting and provided with a central tubular hub, suitable bearings in said hub, an anchoring or guiding member having an upper portion extending within said hub and having a ring or circular frame depending therefrom in a substantially vertical plane, said anchoring member being supported on said bearings and being capable of turning in azimuth, a gimbal ring, a torsion member secured to the upper portion of said guiding member and suspending said gimbal ring within said circular frame, a gyro wheel, a suitable casing in which said wheel is journaled, horizontally alined pivots supporting said casing within said gimbal ring, yielding means operatively connecting said casing with said anchoring and guiding member and capable of exerting a tilting torque on said casing upon relative movement between the casing and the anchoring member, means for spinning the gyro wheel, an electric motor carried by said Cardan mounting, gearing connecting said motor with said anchoring member, power circuits for respectively actuating said motor in forward and reverse directions, and coöperating contact members operable by the relative azimuth movements of the anchoring member and the gimbal ring for opening and closing said circuits.

44. Gyro navigation apparatus, comprising, in combination, a gyro wheel, means supporting said gyro wheel for movement in three degrees of freedom, said gyro wheel being statically balanced about its three axes, a correcting device structurally independent of said gyro wheel and supporting means mounted for independent movements in azimuth, but in operative relation thereto, said device being normally without effect upon the freedom of said wheel, and means operatively connecting said device with said wheel and arranged to produce a correcting torque on the wheel when the latter tends to alter its position relative to said device.

45. Gyro navigation apparatus comprising, in combination, a gyro wheel, means whereby said wheel is mounted to spin normally about a substantially horizontal axis and to be capable also of turning in azimuth and elevation, a guiding element capable of moving in azimuth substantially coaxially with said gyro wheel and relatively thereto, yielding means operatively connecting said guiding element with said gyro wheel, means normally holding said guiding element stationary relative to said gyro wheel about a horizontal axis, and means for causing the guiding element to follow the apparent azimuth movements of said gyro wheel when such movements exceed a predetermined limit.

46. Gyro navigation apparatus comprising, in combination, a gyro wheel, means whereby said wheel is mounted to spin in a substantially vertical plane about a normally horizontal axis and to be capable also of turning in azimuth and elevation, an annular guiding element substantially concentric with said wheel and capable of moving in azimuth coaxially therewith and relatively thereto, and means yieldingly connecting said guiding element with the wheel mounting and arranged to restrain relative movement between the same.

47. Gyro navigation apparatus comprising, in combination, a gyro wheel, means whereby said wheel is mounted to spin in a substantially vertical plane about a normally horizontal axis and to be capable also of turning in azimuth and elevation, an annular guiding element substantially concentric with said wheel and capable of moving in azimuth coaxially therewith and relatively thereto, and means yieldingly connecting said guiding element with the wheel mounting and arranged to exert a tilting stress on the wheel upon change in the relative azimuth positions of said element and said wheel, a motor arranged, when suitably actuated, to drive said element in azimuth, and means whereby said motor is automatically actuated when the relative positions in azimuth of said element and said wheel become altered to a predetermined extent.

48. In an electrically driven gyroscopic master compass, an azimuth movable unit comprising a sensitive element and means whereby the same is movably supported including a member, the element and member being adapted for limited relative azimuth movement, means whereby an electric current is supplied to the unit, including a set of rings and a set of contacts therefor, one set being carried by said member and independent power means for aiding the element in imparting azimuth movement to the member against the friction of said sets.

49. In a gyroscopic compass, an electrically driven gyro wheel, means whereby the same is movably supported including a member, the wheel and member being adapted for independent azimuth movement, means whereby an electric driving current is supplied to the wheel including a set of rings and a set of contacts, the two sets being in mutual frictional contact and one set being carried by said member, and means other than the wheel for imparting azimuth movement to the member against the friction between said sets.

50. In a gyro-compass, a gyro wheel, a journal frame for said wheel, a supporting means for said frame pivoted for orientation and independently actuated automatic means controlled by the position of said frame for orienting said support whereby it maintains a predetermined position with respect to said frame.

51. In a gyro-compass, a gyro wheel, a journal frame for said wheel, a support for said frame pivoted for orientation, a centralizing means operating between said frame and said support, and automatic means controlled by the position of said frame for orienting said support whereby it maintains a predetermined position with respect to said frame.

52. In a gyro-compass, a gyro wheel and frame therefor statically balanced about and pivotally supported on a horizontal axis, and a pendulous mass supported independently of said wheel and frame on approximately the same horizontal axis and connected to said frame so as to impart ballistic properties thereto.

53. In a gyroscopic compass, a rotor and rotor bearing casing, a pendulous frame mounted for universal oscillation for supporting said casing, said casing being mounted within the frame on horizontal pivots, yielding means connecting said frame and said casing, and means whereby the system comprising the parts already named is mounted for movement about a vertical axis.

54. In gyro navigational apparatus, a rotatably mounted support, a flexible suspension means secured thereto, a sensitive element suspended from said means, and including a gyro wheel and journal frame, and power means responsive to relative movement between said support and said element for causing said support to follow the movements of said element.

55. In gyro navigational apparatus, a rotatably mounted support, a sensitive element mounted on said support, capable of movement relative thereto about a vertical axis, and including a gyro wheel and journal frame, a pair of reversing contacts mounted side by side, a coöperating trolley therefor adapted to roll from one to the other, said contacts and trolley being mounted respectively on said support and element, a reversible motor in circuit with said contacts, and means for rotating said support from said motor.

56. In gyro navigational apparatus, a rotatably mounted support, a sensitive element mounted on said support, capable of movement relative thereto about a vertical axis, and including a gyro wheel and journal frame, coöperating contacts mounted respectively on said support and element, a reversible motor in circuit with said contacts, means for rotating said support from said motor and a rotatable commutating transmitter driven by said motor.

57. In gyro navigational apparatus, a follow-up member, a sensitive element mounted for movement relative thereto, coöperating contacts respectively mounted on said member and element including a pair of contacts mounted side by side and a coöperating trolley adapted to roll from one to the other of said contacts as relative movement takes place between said member and element; a motor in circuit with said contacts, a rotatably commutating transmitter driven by said motor and a follow-up means connecting said motor and said member.

58. In a gyro compass, the combination with a main support, of an azimuth movable unit mounted thereon and comprising a supporting element journaled on said main support, a gyro wheel, a journal frame for said wheel, and means for pivotally supporting said frame from said element for relative movements in elevation.

59. A gyro navigation apparatus comprising a gyro wheel, means whereby said wheel is mounted to spin on a normally horizontal axis and to move about a second horizontal axis at a substantial angle to the spinning axis and also to move about a vertical axis, and a single means for restraining the free movement of said gyro, said means being adapted to exert a torque on said gyro causing precession in a plane inclined to the horizontal.

60. Gyro navigation apparatus comprising a gyro wheel, supporting means for said wheel permitting the wheel to spin about an axis and to move about two other axes, a member arranged for movement substantially co-axial with and relative to said wheel about one of the said other two axes, a pendulum supported on said member and operatively connecting said member with said supporting means and means for moving said member.

61. In gyroscopic apparatus, a gimbal ring mounted for rotation about a vertical axis, a rotor-bearing casing pivoted therein about an axis at an angle to said vertical axis, means whereby said casing may be exhausted of air, and an electric motor gyroscope contained and journaled within said casing.

62. In gyro navigational apparatus, an azimuth movable unit comprising a follow-up member, a sensitive element mounted for movement relatively thereto, coöperating contacts mounted on said member and element, a yielding connection between said motor and said element, a motor in circuit with said contacts, and a follow-up connection between said motor and said member.

63. In gyroscopic apparatus, a gyro wheel, forming the rotor for an electric motor, a rotor-bearing casing inclosing the wheel and adapted to be exhausted of air, a stator for such motor also within said casing, and a gimbal ring in which the casing is pivotally mounted.

64. In a gyro navigational apparatus, an azimuth movable unit comprising a follow-up pivotally mounted support, a sensitive element pivotally mounted on said support, said element including a gyro-rotor and rotor bearing frame, electrical contacts mounted on said support and element including reversing contacts having a small gap therebetween, and a coöperating brush therefor, a reversible motor in circuit with said contacts, and reduction gearing connecting said motor and said support.

In testimony whereof I have hereunto set my hand in presence of two subscribing witnesses.

ELMER A. SPERRY.

Witnesses:
HANNIBAL C. FORD,
CHARLES H. CONNER.